Aug. 10, 1937.    G. A. CAMERON    2,089,183
SIGNAL SWITCH
Filed March 3, 1936
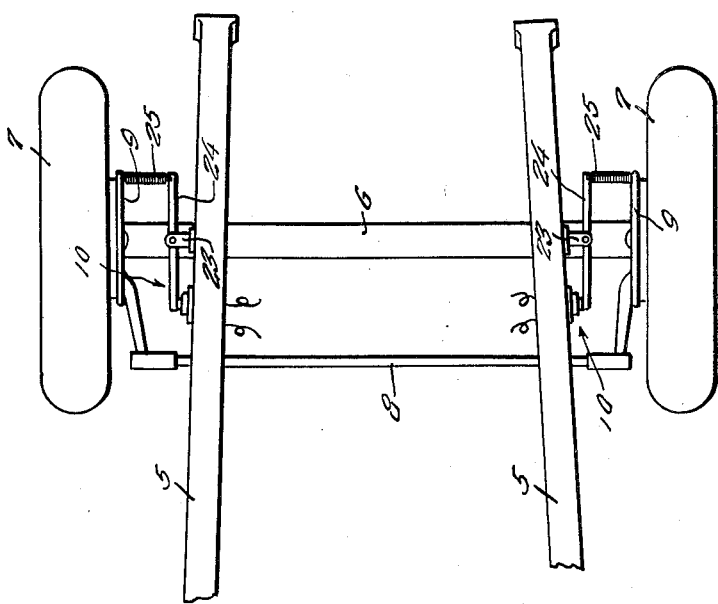
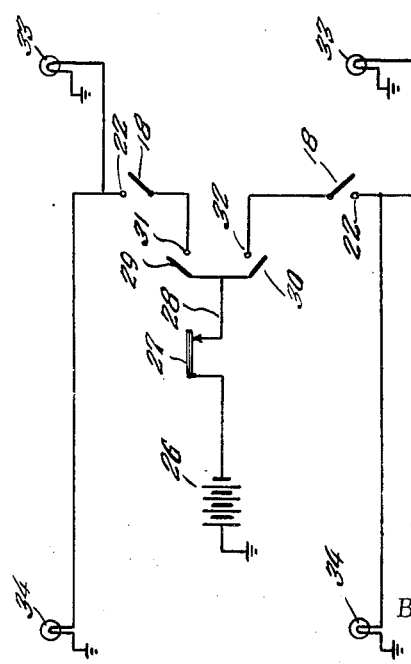
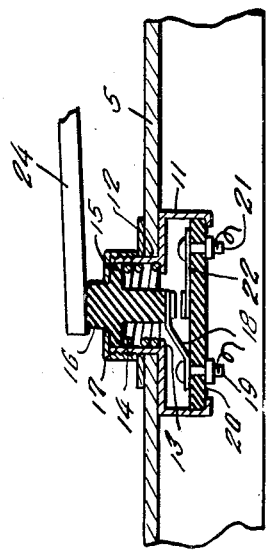
Inventor
G. A. Cameron
By Clarence A. O'Brien and
Hyman Berman
Attorneys Patented Aug. 10, 1937

2,089,183

UNITED STATES PATENT OFFICE 2,089,183

SIGNAL SWITCH

George A. Cameron, Saint John, New Brunswick, Canada

Application March 3, 1936, Serial No. 66,981

1 Claim. (Cl. 200—59)

This invention appertains to new and useful improvements in signal switches for automobiles and other wheeled vehicles of the steerable type.

An important object of the present invention is to provide signal switch means for automobiles wherein a directional signal will be energized upon the turning of the steerable wheels of the vehicle.

Another important object of the invention is to provide signal switch means for automobiles which will be substantially fool-proof in operation.

Other important objects and advantages of the invention will become apparent to the reader of the following specification.

In the drawing:

Figure 1 represents a diagrammatic view showing the electrical connections between the electrical devices involved.

Figure 2 represents a fragmentary top plan view of the chassis and steerable wheels of an automobile showing the switch means installed thereon.

Figure 3 is an enlarged fragmentary detailed sectional view of one of the automatic switches.

Referring to the drawing wherein like numerals designate like parts, it can be seen that numerals 5—5 represent the side beams of the usual automobile chassis frame. Numeral 6 is the usual front axle bar to the ends of which the front steerable wheels 7—7 are attached and connected by the tie rod 8. The housings of the brake drums are denoted by reference character 9 and interposed between these brake housings and the corresponding chassis bars 5 are the automatic switches generally referred to by numeral 10.

As these switches are both of like structure, a description of one will suffice for both.

Reference is now made to Figure 3, where it can be seen that the switch includes a casing 11 having a reduced tubular extension 12 disposed through an opening in the corresponding chassis bar 5, and at the inboard end of this tubular extension 12 is a small circumferentially extending lip 13 which acts as an abutment for one end of the coiled compressible spring 14 located in the tubular extension 12 and bearing at its opposite end against the circumferential flange 15 of the push button 16, this push button being of dielectric material. A threaded cap 17 is threadedly engaged over the outboard end of the tubular extension 12 to hold the button 16 in the position substantially shown in Figure 3. The inboard end of the button 16 bears against the free end of the strip spring 18 which is anchored to the binding post 19 on the dielectric plate 20 which forms the back wall of the casing 11.

A binding post 21 has a strip contact 22 extending therefrom to underlie, normally in spaced relation the free end of the strip contact 18.

A yoke 23 on chassis bar 5 rockably supports the arm 24, one end of which normally rests against the outboard end of the button 16. The opposite end of the rockable arm 24 is connected to the corresponding brake housing 9 by a coiled extensible spring 25.

Referring to Figure 1, it can be seen that numeral 26 represents a source of current which connects to the current cut-out 27 and from there a jumper 28 extends to the contactors 29—30 selectively operative against the contacts 31—32 respectively. The contacts 31—32 are connected to the contact strips 18 and the contact 22 connects the front and rear signal lamps 33—34 in multiple as clearly shown in Figure 1.

Thus it can be seen, that when (for instance) the switch 29 engages the contact 31, current is supplied through this switch so that when the vehicle is steered in this direction movement of the corresponding wheel 7 will rock the arm 24 so as to depress the button 16, close the switch 18—22 and thus result in the supply of current to the lamps 33—34 on one side of the vehicle.

It is also suggested that the right and left signal lights be of different colors, that is the right signal light "green" and the left signal light "red" better define the direction in which the driver intends to turn, especially when the visibility is such that the outline of the vehicle cannot be easily discerned.

While the foregoing specification sets forth the invention in specific terms, it is to be understood that numerous changes in the shape, size and materials may be resorted to without departing from the spirit or scope of the invention as claimed hereinafter.

Having thus described the invention, what is claimed as new is:

In combination, a vehicle chassis frame, a vehicle wheel, a stationary brake drum in conjunction with the wheel, an elongated member rockably supported at its intermediate portion on the said chassis frame, a switch on the chassis frame in the path of one end of the rockable member, and a coiled extensible spring connection between the opposite end of the rockable member and the said drum.

GEORGE A. CAMERON.